(12) United States Patent
Miao et al.

(10) Patent No.: US 8,792,519 B2
(45) Date of Patent: Jul. 29, 2014

(54) METHOD FOR TRANSFERRING NETWORK EVENT PROTOCOL MESSAGES

(75) Inventors: Fuyou Miao, Shenzhen (CN); Yuzhi Ma, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 450 days.

(21) Appl. No.: 11/616,949

(22) Filed: Dec. 28, 2006

(65) Prior Publication Data

US 2007/0211760 A1 Sep. 13, 2007

(30) Foreign Application Priority Data

Mar. 9, 2006 (CN) .......................... 2006 1 0057508

(51) Int. Cl.
*H04J 3/24* (2006.01)
(52) U.S. Cl.
USPC ............................ 370/474; 370/464; 709/223
(58) Field of Classification Search
USPC .................. 370/464, 474; 709/223
See application file for complete search history.

(56) References Cited

U.S. PATENT DOCUMENTS

| | | | | |
|---|---|---|---|---|
| 5,361,372 A | * | 11/1994 | Rege et al. | 709/234 |
| 6,654,796 B1 | | 11/2003 | Slater et al. | |
| 6,978,384 B1 | * | 12/2005 | Milliken | 726/26 |
| 7,155,512 B2 | | 12/2006 | Lean et al. | |
| 7,434,255 B2 | * | 10/2008 | Akimoto | 726/13 |
| 2003/0105850 A1 | * | 6/2003 | Lean et al. | 709/223 |
| 2005/0018670 A1 | * | 1/2005 | Shigematsu et al. | 370/389 |
| 2005/0120079 A1 | * | 6/2005 | Anderson et al. | 709/203 |
| 2005/0254518 A1 | * | 11/2005 | Fujimori | 370/466 |
| 2006/0271826 A1 | * | 11/2006 | Desai et al. | 714/38 |

FOREIGN PATENT DOCUMENTS

CN 1581869 A 2/2005

OTHER PUBLICATIONS

Gerhards, "The Syslog Protocol," IETF Standard-Working-Draft, vol. Syslog, No. 16, pp. 1-45 (2006).
Postel, "User Datagram Protocol," retrieved from Internet on Oct. 13, 1998, URL: http://www.pmg.lcs.mit.edu/cgi-bin/rfc/view?number=768.
European Search Report for Application No. 06127301.7-2416, dated Aug. 27, 2007.
Cover page listing prior art of corresponding Chinese Patent No. 100583889C, issued on Jan. 20, 2010, 13 pages total.
First Office Action of corresponding Chinese Patent Application No. 200610057508.0, mailed on Apr. 10, 2009, and translation there of, 10 pages total.
First Office Action of corresponding European Patent Application No. 06127301.7, mailed on Feb. 16, 2009, 4 pages total.
Dierks et al, "The Transport Layer Security (TLS) Protocol Version 1.1," Internet-Draft draft-ietf-tls-rfc2246-bis-13.txt, The Internet Society, Jun. 2005, 81 pages total.

(Continued)

*Primary Examiner* — Un C Cho
*Assistant Examiner* — Siming Liu
(74) *Attorney, Agent, or Firm* — Huawei Technologies Co., Ltd.

(57) ABSTRACT

A method for transferring network event protocol messages includes: attaching message length information to SYSLOG (network event protocol) messages; the receiver of the SYSLOG messages parses the SYSLOG messages from the received transport payload according to the message length information. By means of the method in this invention, SYSLOG messages can be rapidly parsed from the received transport payload by the receiver of the SYSLOG messages.

15 Claims, 2 Drawing Sheets

(56) References Cited

OTHER PUBLICATIONS

Gerhards, "SSL Encrypting Syslog with Stunnel," Retrieved from the Internet: <http://www.rsyslog.com/doc/rsyslog_stunnel.html>, dated Jul. 22, 2005, 7 pages total.

Kelsey et al., "Signed syslog Messages: draft-ietf-syslog-sign-17.txt," syslog Working Group Internet Draft, The Internet Society, Nov. 22, 2005, 30 pages total.

Lonvick, "The BSD syslog Protocol," Network Working Group Request for Comments: 3164, The Internet Society, Aug. 2001, 26 pages total.

New et al., "Reliable Delivery for syslog," Network Working Group Request for Comments: 3195, The Internet Society, Nov. 2001, 33 pages total.

Okmianski., "Transmission of syslog messages over UDP: draft-ietf-syslog-transport-udp-06," Syslog Working Group Internet Draft, The Internet Society, Nov. 5, 2005, 10 pages total.

Gerhards et "The syslog Protocol; draft-ietf-syslog-protocol-16.txt", syslog Work Group Internet-Draft, Internet Society, Jan. 3, 2006, 46 pages total.

\* cited by examiner

METHOD FOR TRANSFERRING NETWORK EVENT PROTOCOL MESSAGES

This application claims the benefit of Chinese Patent Application No. 200610057508.0, which was filed on Mar. 9, 2006, the entire disclosure of which is hereby incorporated herein by reference.

BACKGROUND OF THE DISCLOSURE

1. Field of the Technology

The present invention relates to the field of communications, and particularly to a method for transferring network event protocol messages.

2. Background of the Invention

SYSLOG (network event protocol) is an event delivery protocol widely used in various network operation systems, such as Microsoft Windows, Unix and Linux, etc.

The SYSLOG protocol works in a Client-Server mode for communication, and the Client is the sender while the Server is the receiver of an event message. The Client may be an event generator such as equipment or a procedure, and it also may be a relay entity which processes the SYSLOG event received from another sender (an event generator or other relay entities) and then sends the processed event to another receiver.

The SYSLOG protocol is a simplex communication protocol, that is, the event message is only sent from the sender to the receiver, and the receiver does not send any acknowledgement, "connect start", "connect close" message or the like, i.e., the receiver never sends any message to the sender in the layer of SYSLOG protocol (however, bi-directional communication may be needed for the transport protocol in the lower layer).

The SYSLOG protocol is a text-based protocol in which all parameter names and parameter values are text, and uses of the characters with code value less than 32 in ASCII code are avoided, that is, uses of the control character are avoided. A SYSLOG message may be simply taken as a text block from the view of the lower layer transfer protocol.

At present, User Datagram Protocol (UDP) is generally used to transfer a SYSLOG message. As UDP is used to transfer a SYSLOG message, each UDP message can only transfer one SYSLOG message according to the relationship between the length of a SYSLOG message and that of a UDP message. The protocol stack for a UDP based SYSLOG message transfer is shown in part A of the schematic diagram of the SYSLOG protocol stack structure in FIG. 1.

However, UDP is an unreliable connectionless protocol in spite of its simplicity and flexibility. Losses may occur during message transfer based on UDP, and such matters as "packet loss" are not handled by the SYSLOG message, thus the loss of the event information may occur while the UDP is used to transfer a SYSLOG message. As a reliable connection-oriented protocol, a transfer control protocol (TCP) may be used to transfer the SYSLOG message so as to improve the reliability of data transfer. A protocol stack for a TCP-based SYSLOG message transfer is shown in part B of the schematic diagram of the SYSLOG protocol stack structure in FIG. 1.

At present, the Internet security is increasingly critical for stably running the network; similarly, the SYSLOG protocol also faces security problems as following:

1. information falsification: the SYSLOG message may be falsified by a malicious intermediate network node during transfer.

2. information leakage: the SYSLOG message may be intercepted illegally during transfer, and information in the SYSLOG message, such as the description information of an event, is taken.

3. identity spoofing: a malicious node imitating as a legal node participates in the communication of SYSLOG.

In order to solve the security problems of the SYSLOG message transfer, the SYSLOG message may be transferred over such secure protocols as Transport Layer Security protocol (TLS), BEEP (a TCP based secure protocol) and Secure SHell protocol (SSH), all of which can provide such safety mechanisms as privacy, integrity and data source verification so that the security problems of the SYSLOG message can be solved. A protocol stack for transferring the SYSLOG message based on TCP or secure protocols is shown in part C of the schematic diagram of SYSLOG protocol stack structure in FIG. 1.

SUMMARY OF THE INVENTION

A method for transferring network event protocol messages includes:

attaching message length information to network event protocol SYSLOG messages to be sent;

parsing, by a receiver of the SYSLOG messages, the SYSLOG messages, according to the message length information, from a transport payload including the SYSLOG messages.

According to an embodiment of this invention, with message length information attached before SYSLOG messages, a receiver of the SYSLOG message may rapidly parse the SYSLOG messages from a transport payload including the SYSLOG messages according to the message length information.

DETAILED DESCRIPTION OF THE PREFERRED EMBODIMENTS

The embodiment of this invention provides a method for transferring a network event protocol message. In the embodiment, message length information is attached before each SYSLOG message, and a plurality of SYSLOG messages with message length information attached form a transport payload.

Figure 1:
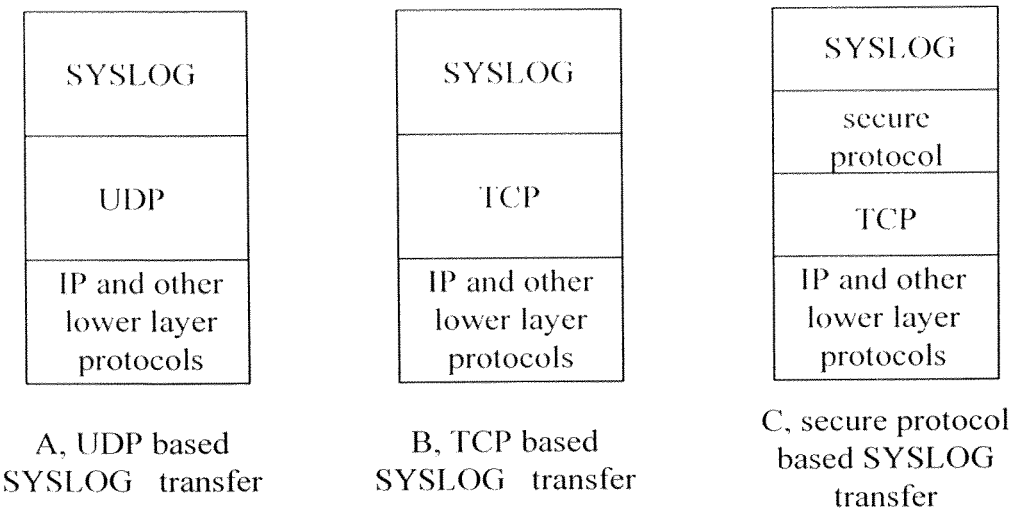
FIG. 1 is a schematic diagram illustrating the SYSLOG protocol stack structure.
Figure 2:
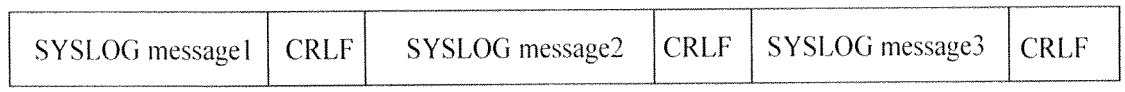
FIG. 2 is a schematic diagram illustrating the process of adding one or more special control characters to the end of each SYSLOG message.
Figure 3:
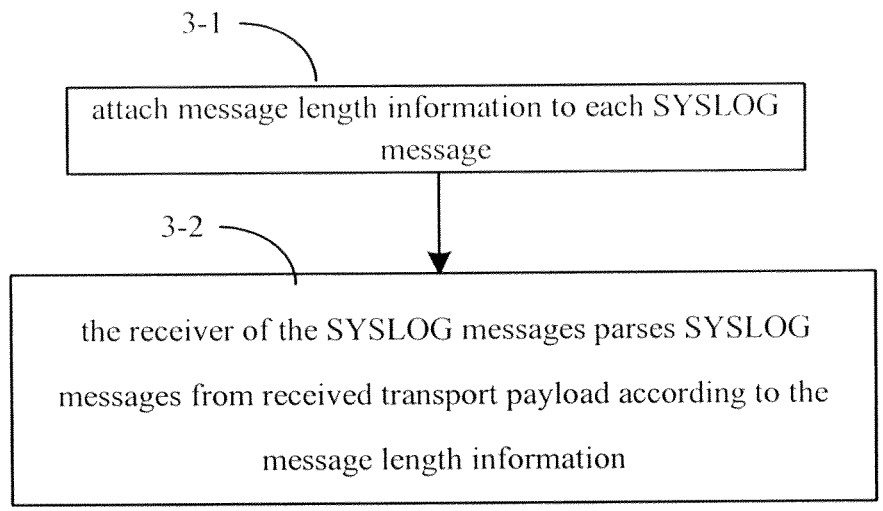
FIG. 3 is a flowchart illustrating the processing procedure of the method according to an embodiment of this invention.

This invention is hereinafter described in detail with reference to the accompanying drawing as well as the embodiment. As shown in FIG. 3, the processing procedure of the method in accordance with an embodiment of this invention includes the following steps.

Step 3-1: attaching message length information to each SYSLOG message.

Message length information needs to be attached to each SYSLOG message to be sent, a plurality of SYSLOG messages with message length information attached form a transfer payload. The message length information may be located before each SYSLOG message.

The message length information indicates the number of the total bytes of the SYSLOG message; the message length information may include or may not include the length of the message length information. The message length information may be denoted by 4 bytes (8 bits in each byte) so that the maximum SYSLOG message length that can be denoted is 232 (4,294,967,296) bytes. The beginning and the end of each SYSLOG message in the transport payload may be rapidly found out according to the message length information.

Step 3-2: the receiver of the SYSLOG message parses the SYSLOG messages from the transport payload including the SYSLOG messages, according to the message length information attached.

After the message length information is attached to the SYSLOG message, the sender of the SYSLOG message sends the SYSLOG message to the receiver of the SYSLOG message. A plurality of SYSLOG messages received by the receiver of the SYSLOG message form a transport payload. According to the message length information attached, the receiver of the SYSLOG message may rapidly determine the beginning and the end of each SYSLOG message in the transport payload one by one, and thereby parses each SYSLOG message one by one.

Figure 4:
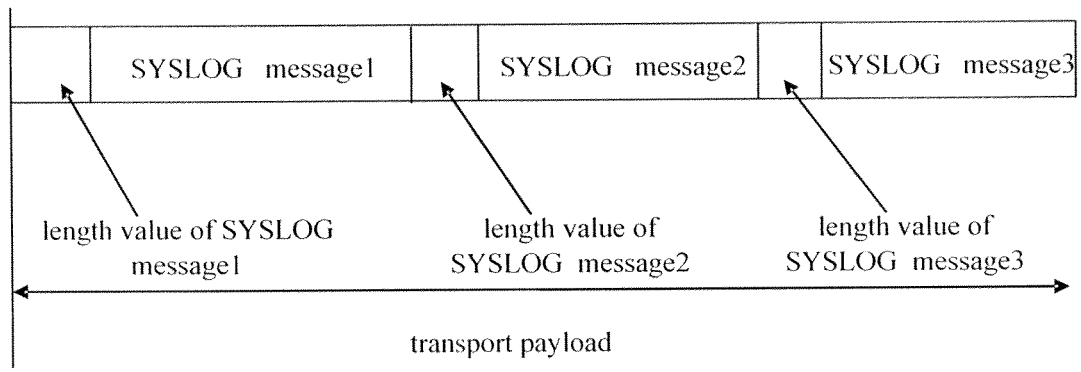
FIG. 4 is a schematic diagram illustrating the transport payload received by the receiver of the SYSLOG message according to the embodiment of this invention.

In an embodiment of this invention, transport payload received by the receiver of the SYSLOG message is shown in FIG. 4. The process for parsing each SYSLOG message one by one from the transport payload is as follows:

1. the receiver of the SYSLOG message reads the first 4 bytes of the transport payload, and obtains the length value n1 of SYSLOG message 1 (suppose that the length value n1 does not include the length of the length value).

2. the receiver of the SYSLOG message reads n1 bytes from the fifth byte of the transport payload on, takes the read bytes as the first SYSLOG message, and gives the first SYSLOG message to a SYSLOG message processing module to process.

3. the receiver of the SYSLOG message reads 4 bytes from Byte n1+4 on, and obtains the length value n2 of SYSLOG message 2.

4. the receiver of the SYSLOG message reads n2 bytes from Byte n1+4*2+1 of the transport payload on, takes the read bytes as the second SYSLOG message, and gives the second SYSLOG message to the SYSLOG message processing module to process.

5. the receiver of the SYSLOG message repeats the aforesaid process, reads all the SYSLOG messages in the transport payload until reaches the end of the entire transport payload.

In the above processing procedure of the method according to the embodiment of this invention, the message length information and additional information related to the SYSLOG message may be attached simultaneously to the SYSLOG message. For example, along with the message length information, the type information of the SYSLOG message and/or padding length information may be attached, and the type information of the SYSLOG message can be used in cooperation with an appropriate local strategy to speed up the process for processing the SYSLOG message. Appropriate bytes may be padded in the end of the SYSLOG message to make an attacker difficult to launch a traffic analysis attack; and the padding length information attached allows the communication equipment to conveniently make an effective parse identification of the SYSLOG message.

The foregoing is only the preferred embodiment of the present invention and is not intended to limit the scope of the present invention. Any modification equivalent substitution, or improvement made without departing from the spirit and principle of the present invention should be covered by the scope set forth in the appended claims.

What is claimed is:

1. In a communication network for parsing multiple event driven protocol messages from a payload of a message, a method for transferring network event protocol messages, comprising:
   attaching first message length information to a first network event protocol SYSLOG message;
   attaching second message length information to a second network event protocol SYSLOG message;
   forming at least a portion of a transport payload by serially adding a first portion and a second portion thereto, wherein the first portion includes the first network event protocol SYSLOG message with the attached first message length information, and the second portion includes the second network event protocol SYSLOG message with the attached second message length information;
   sending the transport payload; and
   parsing, by a receiver of the transport payload, the first and second network event protocol SYSLOG messages one by one from the transport payload by reading the first message length information from the first portion of the transport payload and processing the first network event protocol SYSLOG message according to the first message length information, before reading the second message length information, and thereafter, reading the second message length information from the second portion of the transport payload and processing the second network event protocol SYSLOG message according to the second message length information.

2. The method of claim 1, wherein the first and second message length information indicate the number of bytes of the respective SYSLOG messages.

3. The method of claim 2, wherein the number of bytes of the first and second SYSLOG messages are the number of bytes of the respective first and second SYSLOG messages with or without their respective message length information.

4. The method of claim 1, wherein the attaching of the first message length information comprises:
   attaching the first message length information in front of the first network event protocol SYSLOG message,
   wherein the attaching of the second message length information comprises:
   attaching the second message information in front of the second network event protocol SYSLOG message.

5. The method of claim 4, wherein the parsing of the first and second network event protocol SYSLOG messages comprises:
   determining a beginning and an end of each of the respective first and second network event protocol SYSLOG messages, one by one, in the transport payload; and
   parsing the first and second network event protocol SYSLOG messages according to the first and second message length information, respectively.

6. The method of claim 1, wherein each of the first and second message length information includes 4 bytes.

7. The method of claim 1, further comprising:
   attaching additional information related to the respective first and second network event protocol SYSLOG messages along with the respective first and second message length information.

8. The method of claim 7, wherein the additional information comprises a type of network event protocol SYSLOG message, padding length information, or both, for the respective first and second network event protocol SYSLOG messages, and wherein the method further comprises one or more of:

processing the first and second network event protocol SYSLOG messages in accordance with a local strategy according to the type of the first network event protocol SYSLOG message and the type of the second network event protocol SYSLOG message, respectively; and identifying the first and second network event protocol SYSLOG messages according to the respective padding length information.

9. In a receiver of a communication network for parsing multiple event driven protocol messages from a payload of a message, a method for parsing network event protocol messages, the method comprising:

receiving, from a transmitter of the communication network, a transport payload that includes at least a first portion and a second portion, wherein the first portion includes a first SYSLOG message with first message length information attached thereto, and the second portion includes a second SYSLOG message with second message length information attached thereto; and parsing the first and second SYSLOG messages one by one from the transport payload by reading the first message length information from the first portion of the transport payload and, before reading the second message length information, processing the first SYSLOG message according to the first message length information, and thereafter, reading the second message length information from the second portion of the transport payload and processing the second SYSLOG message according to the second message length information.

10. The method of claim 9, wherein the first and second message length information indicate the number of bytes of the respective first and second SYSLOG messages.

11. The method of claim 10, wherein the number of bytes of the first and second SYSLOG messages is the number of bytes of the respective first and second SYSLOG messages with or without the respective message length information.

12. The method of claim 9, wherein the first message length information is in front of the first SYSLOG message and the second message length information is in-between the first and second SYSLOG messages.

13. The method of claim 12, wherein the parsing of the first and second SYSLOG messages further comprises:

determining a beginning and an end of each of the respective first and second SYSLOG messages, one by one, in the transport payload; and parsing the first and second SYSLOG messages according to the first and second message length information, respectively.

14. The method of claim 9, wherein each of the first and second message length information includes 4 bytes.

15. The method of claim 9, wherein the first and second portions include added information related to the first or second SYSLOG message, respectively, and wherein the added information includes a type of SYSLOG message, padding length information, or both, for the respective first and second SYSLOG messages, and wherein the method further comprises one or more of:

processing the first and second SYSLOG messages in accordance with a local strategy according to the type of the first SYSLOG message and the type of the second SYSLOG message, respectively; and identifying the first and second SYSLOG messages according to the respective padding length information.

\* \* \* \* \*